May 5, 1936.  J. J. SEAVER ET AL  2,039,540
GAS WASHER
Filed June 15, 1934  2 Sheets-Sheet 2
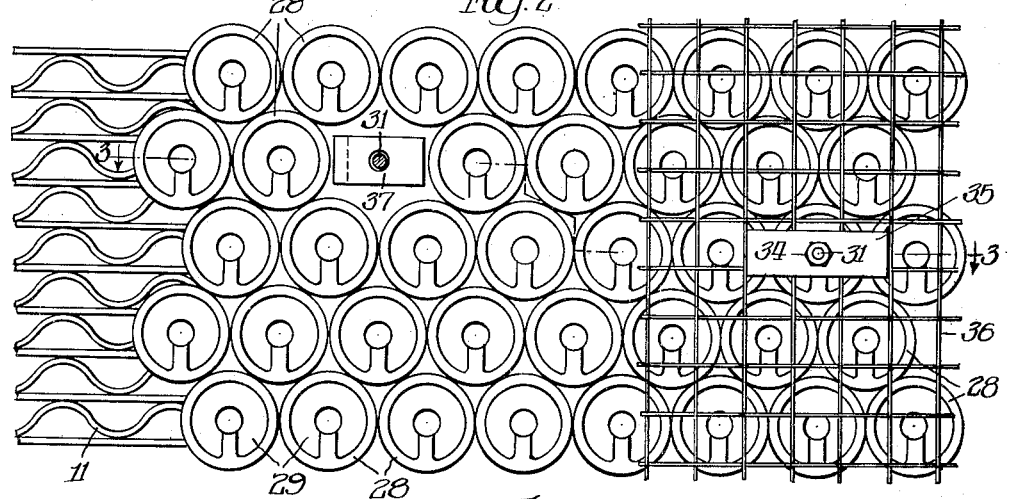
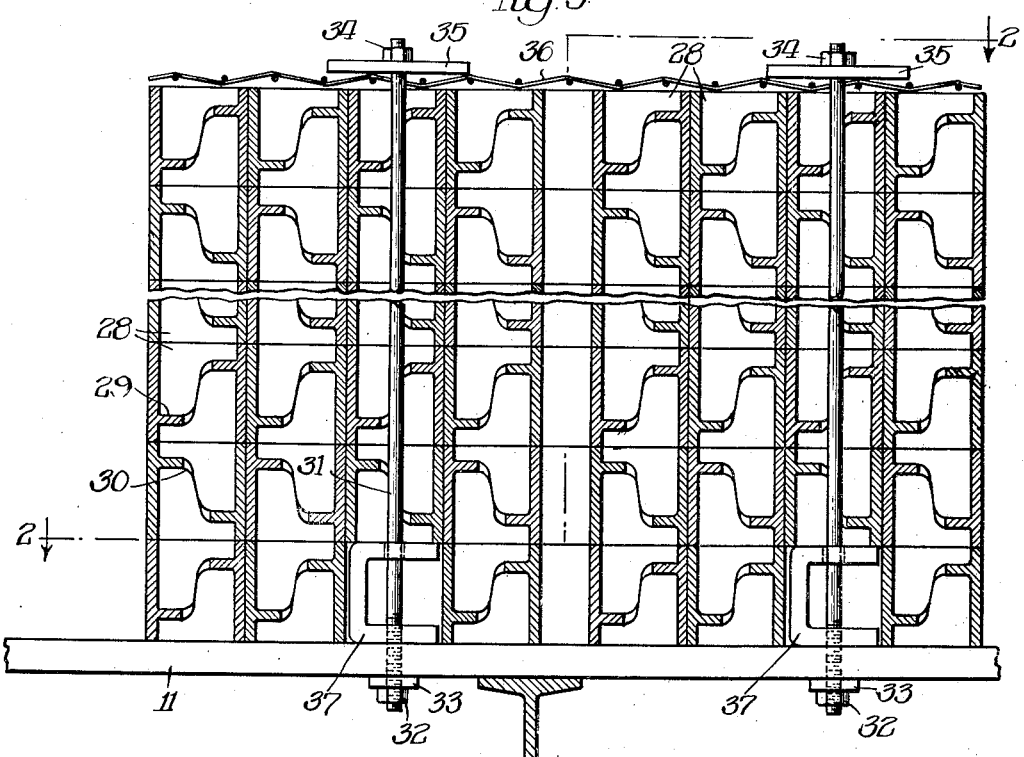
Inventors:
Jay J. Seaver,
Charles E. Dougan,
Harry L. Wetherbee, Patented May 5, 1936

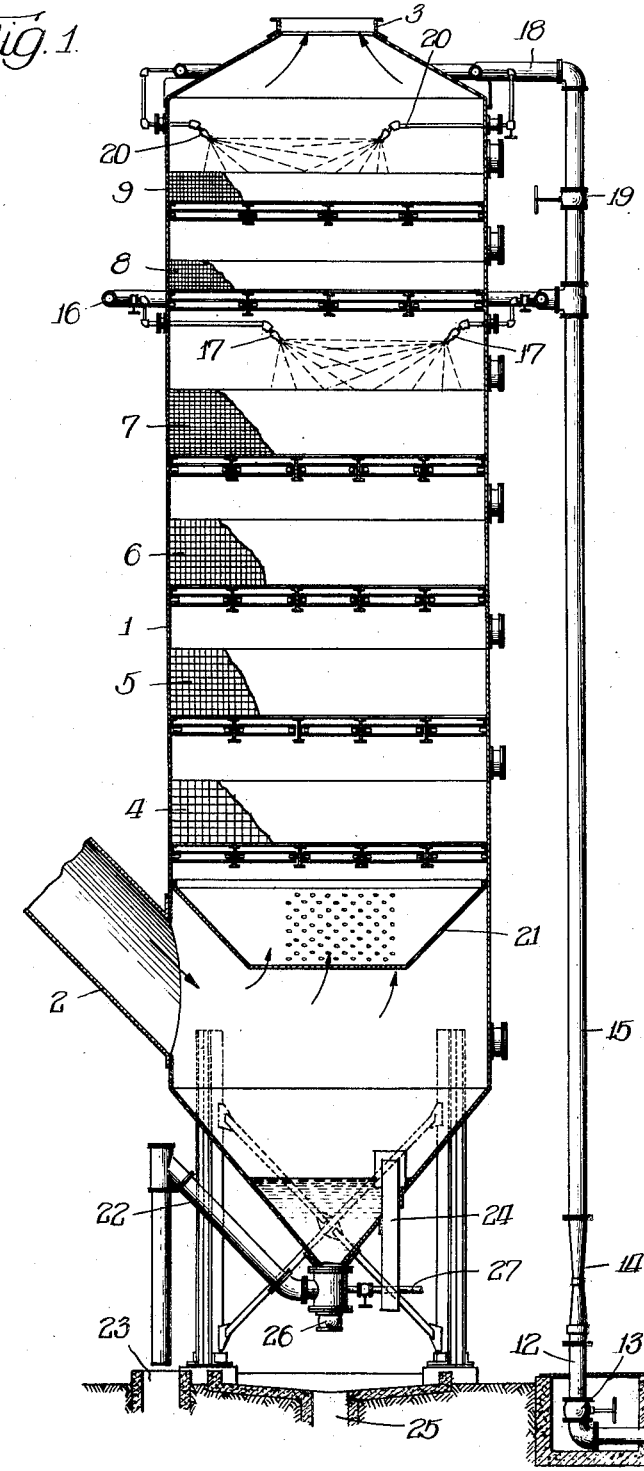

2,039,540

UNITED STATES PATENT OFFICE 2,039,540

GAS WASHER

Jay J. Seaver, Charles E. Dougan, and Harry L. Wetherbee, Chicago, Ill., assignors to H. A. Brassert & Company, Chicago, Ill., a corporation of Illinois Application June 15, 1934, Serial No. 730,688

3 Claims. (Cl. 261—112)

This invention relates to a new and improved gas washer and more particularly to an apparatus for washing and drying gases such as blast furnace gases, boiler gases and industrial gases containing impurities.

Gas washing towers as heretofore generally constructed have used sets of sprays usually applied at the top of a washing tower, causing a rain of water to be distributed over the entire top surface of baffles or hurdles which are used to distribute the gas and water and to expose wetted surfaces to the former. The gases traveling upward through various sets of baffles or hurdles impinge on their wet surfaces and impurities are in this manner separated from the gases as the impurities tend to adhere to the wet surface. The downward flow of water washes the surfaces of the baffles and thus prevents clogging due to the deposit of the impurities on them.

The usual type of wooden hurdle or baffle does not clean the gases as well as might be desired owing to the difficulty in thoroughly contacting the gases with the wet surfaces. We have found that wet ceramic surfaces have a much greater affinity for the impurities carried in the gas, as the rough surface of a ceramic tile seems to have an adhesive quality, while at the same time it can be readily flushed. We have also found that after the gas has been washed it carries a considerable percentage of moisture and this can be very materially reduced if the gas is passed through a series of ceramic tile which are only occasionally flushed in order to keep the surfaces clean. For this latter purpose particularly we prefer tile having spiral vanes or other surfaces which present numerous zones of impact owing to the deflection of the flow of gas from one direction to another. The effect of this impact is to cause the small particles of moisture to adhere to the tile and to coalesce into droplets which run down the sides.

Blast furnace gases, for example, enter the bottom of a washer at temperatures of from 300° F. to 500° F., and this temperature is usually reduced to less than 100° F. at the top. This results in a material reduction in volume of the gases, which, in turn, slows down the velocity through the upper portion of the usual type of washer to a corresponding extent, and thus reduces the turbulence in the passages.

We have found that by progressively decreasing the size of the openings from the bottom to the top of the washer we can materially improve the removal of impurities and if, in addition, water eliminator sections are added above the washing sections, a gas satisfactory for many uses is readily obtained.

In carrying out our invention we prefer to use ceramic spiral fillers, as for example, 6" size in the lower bank, 5" size in a second bank, 4" size in a third bank and 3" size in the upper bank and in the moisture eliminator. We also prefer to make the fillers part with right-hand and part with left-hand spirals and, as far as feasible, alternate the right-hand and left-hand fillers in the columns. This results in quick reversal of the direction of the flow with consequent better elimination of entrained matter. In some cases good results can be obtained without using so many sizes, but we prefer to maintain a gradual reduction of area from bottom to top.

When the washer is used in connection with blast furnaces, provision must be made to satisfactorily hold down the fillers in case of a slip in the furnace which results in suddenly throwing a great volume of gas through the washer. The resulting pressure may be so great that, unless the fillers are securely held in place, serious dislocation and consequent destruction of the uniformity of the filler construction is likely to result.

It is an object of the present invention to provide a new and improved gas washer or the like.

It is a further object to provide a gas washer in which the effective passage areas for the gases are reduced in size as the gases are reduced in volume due to decreased temperature.

It is also an object to provide a gas washer having passages formed in ceramic tile with the tile progressively smaller in the direction of flow of the gases.

It is an additional object to provide a gas washer having a moisture eliminator section of ceramic tile, which section may be periodically flushed for cleaning.

It is a further object to provide a gas washer using small elements making up the contact surfaces and with means for preventing displacement of the elements.

Other and further objects will appear as the description proceeds.

We have shown a preferred embodiment of our invention in the accompanying drawings, in which—

Figure 1 is a vertical section through our improved gas washer;

Figure 2 is an enlarged fragmentary plan view of a contact section taken on line 2—2 of Figure 3; and Figure 3 is a vertical section taken on line 3—3 of Figure 2.

In the drawings the washer comprises a metal shell 1 with a downwardly inclined inlet passage 2 entering the shell adjacent the bottom thereof and an outlet opening 3 at the upper end of the shell. Contactor banks 4, 5, 6, 7, 8 and 9 are located at spaced intervals in the shell. As best shown in Figures 2 and 3, these banks are supported on metal gratings 11 which are of a type commonly known as subway gratings. These gratings 11 are supported on I-beams 13 which extend transversely of the shell 1 and are supported by the shell.

A flushing system is provided comprising pipe 12 controlled by valve 13 which passes through a measuring device 14 to a riser 15. The circular pipe 16 leads from riser 15 to the sprays 17, the sprays being designed and located to fully cover the cross-sectional area of the washer. An additional circle pipe 18 is located at the upper end of the washer and flow to pipe 18 is controlled by valve 19. The sprayers 20 are connected to a pipe 18 and are used at desired intervals for flushing the moisture eliminating banks 8 and 9. A perforated deflecting and distributing plate 21 is located below the lower contactor bank 4.

The dirty water passes off through overflow pipe 22 to the drain 23. An emergency overflow pipe 24 is provided, this pipe 24 discharging into drain 25. A quick opening valve 26 is located at the bottom of the washer tower to remove sediment depositing in the bottom when necessary, and a connection 27 is provided for flushing out the bottom.

Figures 2 and 3 show in detail the method of assembling and retaining in place the ceramic tile 28. These tile are preferably cylindrical in outer contour and are of a height equal to their diameter. Their interior surfaces carry spiral vanes 29 which are of such radial dimension as to leave a clear central opening through the tile. Certain of the tile are provided with vanes 30 which are formed upon a spiral in the reverse direction to the vanes 29. As shown in Figure 3, the adjacent layers of tile may have the reversely extending vanes so as to increase the turbulence of the gases and thus increase the amount of surface contact.

The bolts 31 extend through the tile and have nuts 32 and bearing plates 33 on their lower ends, the plates 33 engaging the under side of the grating 11. The upper ends of the bolts 31 are provided with nuts 34 and bearing plates 35, the plates engaging the heavy wire mesh fabric 36 which extends over the tops of the tile 28. The bolts 31 are placed at proper intervals to effectively hold down the tile in the event of furnace slips and rushes of gas through the washer.

Since it is desirable to place the bolts 31 in position at the time the initial layer of tile is placed, we have provided the spacer or retaining members 37 which correspond in height to the tile. The bolts 31 are threaded into the lower arms of the members 37 and thus by applying the plates 33 and nuts 32 the bolts are retained in position independently of the tile. The grating 11 may be secured to the beams 38 to prevent displacement.

While the washer which we have shown is a preferred form of construction, operating conditions may call for either increase or decrease in the number and extent of the hurdle banks, both for washing and eliminating, and also the relative size of the openings.

As an example, a washer for blast furnace gas 20 feet in diameter will have a capacity of approximately 100,000 cubic feet of gas per minute, and will require approximately 28 gallons of flushing water per thousand cubic feet of gas, or a total of 2800 gallons a minute of flushing water on the washing sections.

The eliminator sections are preferably flushed at the time of casting the furnace, usually every 4 to 6 hours. It will be recognized that with the amount of gas and water mentioned it is very important to reduce as much as possible back pressure in the tower, and we have found that spiral tile are very satisfactory in this regard.

We have found that in some cases hot water washing is more efficient than cool water washing. In such cases considerable vapor is naturally formed in the lower sections and this increases the volume of the gases and vapors to be handled quite materially. In order to keep the pressure drop within satisfactory limits this necessitates a larger free area at the bottom. As, however, the vapors will be largely condensed before reaching the top it becomes of much greater importance to graduate the openings so that the velocity of the gases will be maintained through the upper banks.

While we have shown and described one preferred form of construction, it will be understood that it may be modified to meet varying conditions and requirements and we contemplate such changes and variations as come within the spirit and scope of the appended claims.

We claim:

1. In a gas washer, a vertical chamber, means for introducing gases into the lower end of the chamber, means for withdrawing gases from the upper end of the chamber, vertically spaced banks of ceramic contact members in said chamber, said ceramic members having vertical openings therein, the openings in the several banks of tile being smaller in size in the upper banks of tile, screens extending across the upper surfaces of the banks of tile, and vertical tie rods extending through the tile banks to hold the screens down to prevent vertical displacement of the tile.

2. In a gas washer and dryer, a chamber, means for introducing gas into one end of the chamber, means for withdrawing gases from the opposite end of the chamber, separated banks of contact members in the chamber, said banks comprising ceramic tile, means for causing a continuous flow of water over lower banks of tile, and means for selectively applying water to upper banks of tile to remove deposits thereon, the upper banks of tile having smaller openings therethrough than the lower banks of tile and serving between deposit removal periods to remove entrained moisture from gases passing therethrough.

3. In a gas washer and dryer, a chamber, means for introducing gas into one end of the chamber, means for withdrawing gases from the opposite end of the chamber, separated banks of contact members in the chamber, said banks comprising ceramic tile, holding means engaging the upper surfaces of said banks of tile and means positively locking the holding means in place to restrain the tile against upward movement, means for causing a continuous flow of water over lower banks of tile, and means for selectively applying water to upper banks of tile to remove deposits thereon, the upper banks of tile serving between deposit removal periods to remove entrained moisture from gases passing therethrough.

JAY J. SEAVER.
CHARLES E. DOUGAN.
HARRY L. WETHERBEE.